United States Patent
Page

[15] 3,700,191
[45] Oct. 24, 1972

[54] PARASAIL, GLIDER TYPE AERIAL DEVICE

[72] Inventor: Patrick E. Page, 393 Cronin Drive, Santa Clara, Calif. 95051

[22] Filed: Sept. 8, 1970

[21] Appl. No.: 70,009

[52] U.S. Cl. ..................................244/16, 244/142
[51] Int. Cl. .............................................B64c 31/02
[58] Field of Search......244/13, 16, 4, 138, 142, 145, 244/152

[56] References Cited

UNITED STATES PATENTS

| 245,768 | 8/1881 | Beeson | 244/16 |
| 1,006,967 | 10/1911 | McHenry | 244/4 |
| 2,649,265 | 8/1953 | Grant | 244/13 |
| 2,599,435 | 6/1952 | Cumming | 244/4 |
| 3,285,546 | 11/1966 | Jalbert | 244/145 |
| 3,412,963 | 11/1968 | Struble, Jr. | 244/146 |

Primary Examiner—Milton Buchler
Assistant Examiner—Carl A. Rutledge
Attorney—Robert B. Crouch

[57] ABSTRACT

The parasail, a glider type aerial device, uses aeronautical principles found on conventional parachutes and sailplanes, thus its name. This craft uses airfoil shaped flying surfaces connected, via a multiplicity of shroud lines, to an external load and control carrying spar and its payload. The wings fly above the spars in a similar manner as a parachute canopy does above its payload. These wings are split at their center to provide angle of attack changes independently from each other. The pilot actuates a set of independently moving spars, using two control levers, that in turn change the angle of attack of the wings using a multiplicity of shroud lines as a transmittal medium. This allows the change to the speed, lift coefficients and direction of travel of the Parasail. By the use of a fully controlled flying wing with its load and control spar far below the wing itself, the result is a glider type of aerial device with a very low center of gravity with great in flight stability. Due to its structural simplicity, flight stability, ease of operation, low cost of manufacturing and operation, a soaring craft is obtained, that has many desirable features for its intended purpose as a sporting aerial machine.

3 Claims, 3 Drawing Figures

PATENTED OCT 24 1972 3,700,191
SHEET 1 OF 2
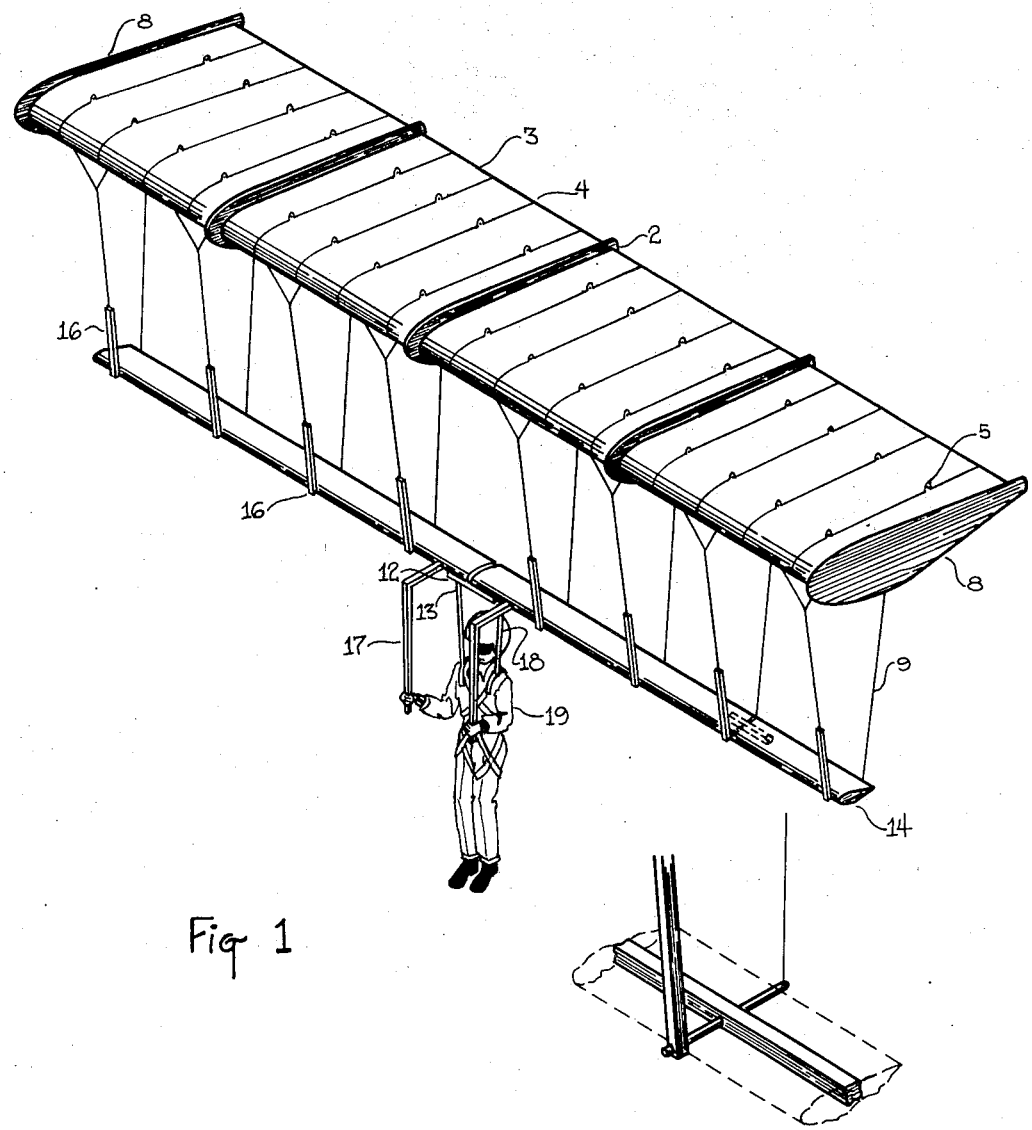
Fig 1
Fig 3
INVENTOR.
BY 

PARASAIL, GLIDER TYPE AERIAL DEVICE

The present invention relates to a glider type of aerial device, based upon the use of airfoil shaped flying surfaces connected to an external load carrying spar and payload via a multiplicity of shroud lines for the purpose of providing a soaring machine to be used in a somewhat similar manner as a conventional soaring sailplane.

More particularly the invention provides that the flying surfaces or wings be split at its center and thus operated independently of each other to affect angles of attack changes to permit flight path control. This operation is done by the pilot actuating a set of independently moving external spars that in turn, through a multiplicity of shroud lines, provides changes to the angle of attack of the wing.

The above objectives will be apparent from the following detailed description, when read in conjunction with the drawings, wherein:

FIG. 1 is an isometric elevation view of the Parasail in a soaring attitude;

FIG. 3 is a detail of a crossarm and spar junction;

Figure 2:
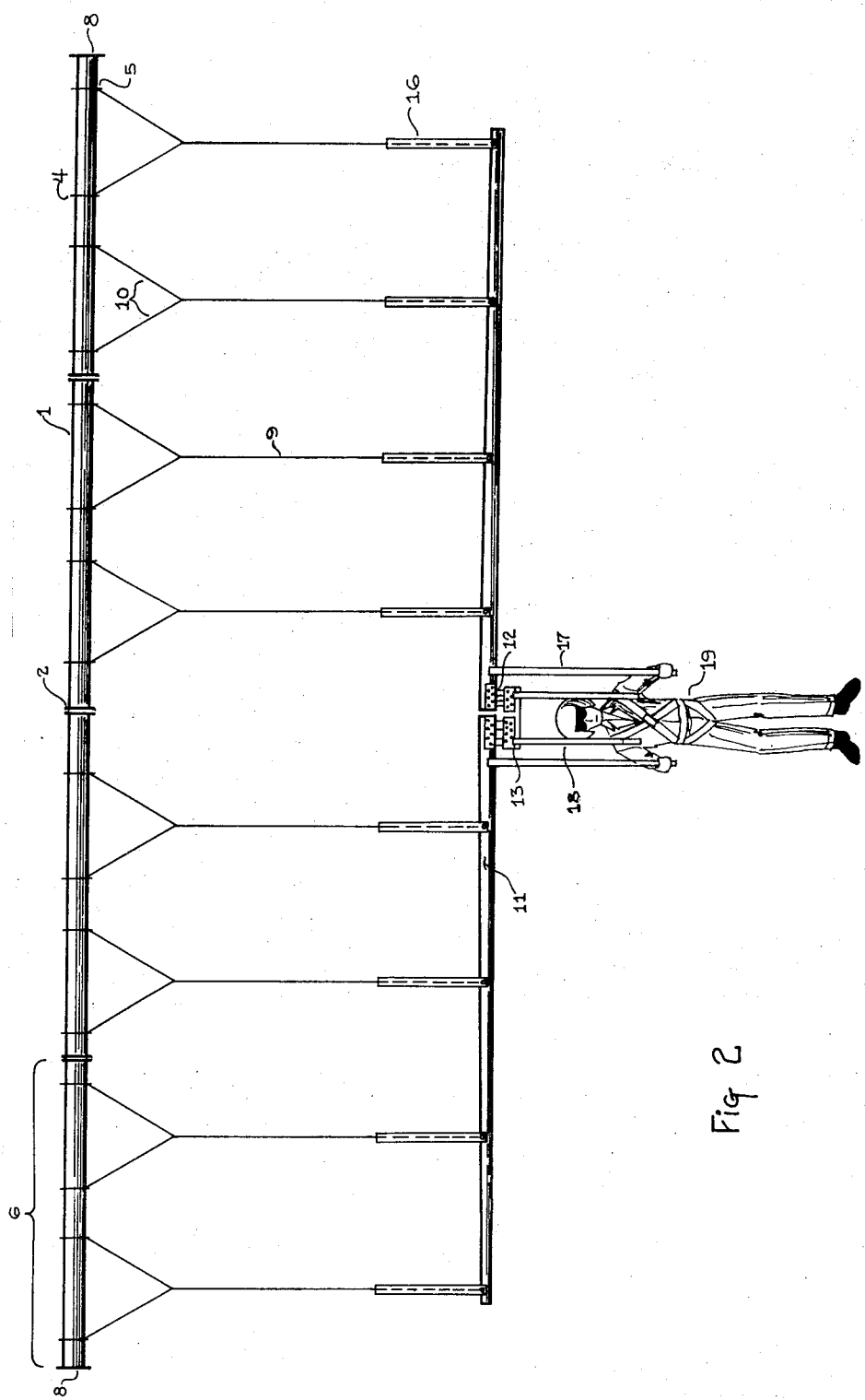
FIG. 2 is a front view of the craft.

Referring now in detail to the drawings of FIG. 1 through 3 that illustrate the Parasail, a form of sailplane using a unique combination of techniques found on fixed wing gliders and parachutes. Its name, Parasail, is thus a contraction of the words PARAchute and SAILplane. This craft is intended mainly as a sporting type of soaring craft, using climbing winds found usually on the windward side of hills or by the equally climbing air of thermal updrafts, and thus be able to remain aloft as sailplanes do. Its flight behavior is similar to that of a sailplane.

The wing 1 is split at its center 2 so each wing panel is operated by the pilot, independently of each other for the purpose of controlling its angle of attack and thus its flight path. The Parasail can use one or more wings 1 stacked one above the other, to suit the payload being carried. The wing 1 is made of a multiplicity of airfoil shaped sections 3 bonded together. The point at which each section joins another, uses a vertical partition 4 that serves as a tie point 5 for the load carrying lines 9. The innermost partitions at the wing's center, have properly shaped bearing plates 2 to protect the wings while they move with respect to each other. Each wing panel 1, from the center line, can in turn consist of two or more sections 6, that when connected to different control crossarms 7, can provide differential control to each wing section 6. The outer plates 8 or tip plates serve an aerodynamic purpose by providing a barrier to a spill over of the airflow from the bottom of the wing to the top of it, thus improving the efficiency of the wing.

The spacing between load lines 9 can vary depending upon the loads, method of construction or airfoil used. The placement of the tie points 5 for the load and control lines 9 is governed by the control requirements, airfoil used, materials an techniques of construction used for the wing and spars 11. The load and control lines 9 can be split on a Y fashion 10 close to the wing bottom, to avoid having too many lines and thus unduly increasing the drag of the glider. The number, size and length of the lines is dictated by the drag, load and stability desired in the craft. Any additional wing panels flying above the main one, can carry similar load — control lines 9.

The rigid load carrying spars 11 are hinged to a center section 13. The load — control lines 9 are attached to the spars 11 via a set of cross arms 7. The spars can be built of any material that can provide the strength to weight desired. Aluminum, fiberglass, wood, etc. are suitable materials. For the purpose of aerodynamic drag reduction and to carry the torsional loads, the spar can be covered with a rigid shroud 14 with the proper shape. By using a larger area shroud 14 over the spar 11, a secondary control surface can be obtained in that manner. The front load-control lines, at their bottom or lower end, reach the spar crossarms 7 through a multiplicity of rigid members 16 with restricted swiveling travel. The purpose of these members 16 on the lower portion of the front load-control lines, is to remove all the angle of attack of the wings, when they lay on the ground prior to the take off, thus preventing the wing from taking off before the pilot wishes to do so. Also, the removal of the angle of attack is required, after landing thus preventing the wings from being blown back, dragging the pilot along. All the pilot needs to do to remove the angle from the wing, is to bend forward thus shortening the forward load-control lines in relation to the aft ones.

The roots of the independently movable spars 11 are hinged 12 to the center section 13 through a set of suitable fittings. Just outside the hinging points there is a pair of levers 17, properly shaped, to transmit the operator's arm movements, to the movable spars 11 and thus obtain a change in the angle of attack of the wings. While on the ground the pilot holds the weight of the spars 11 and center section 13, through a properly designed shoulder stand 18 that in turn is held in place over the pilot's shoulders by a parachute like harness 19. This harness 19, while in flight, carries the pilot safely attached to the spar center section 13.

The operation of the Parasail requires that the air traversing the wing reach a velocity of about 17 miles per hour before the lift generated by the wing is able to lift loads of about one pound per square foot of wing area. This speed can be achieved by towing the glider or by alighting from the slope of a hill facing into winds of the above mentioned speed, without the operator needing to have any forward speed relative to the ground. By decreasing or increasing the angle of attack of both wings, the glider speed can be controlled. By changing the angle of attack of one wing with respect to the other, the pilot can achieve changes in the path of his flight, by executing left or right turns as desired. Other combinations of angles of attack and speeds will produce other flight attitudes as needed, like, for example, the sudden increase of angle of attack required prior to touch down, upon landing, to trade forward speed for lift.

It will be apparent from the foregoing that a very novel glider type of aerial device has been provided. The device is simple in construction, is inexpensive in manufacture, is strong, durable and most effective for the purpose indicated.

It is to be understood that the invention is not limited to the precise construction shown, but changes are contemplated as readily fall within the spirit of the invention as shall be determined by the scope of the subjoined claims.

I claim:

1. A glider type aerial device comprising:

an elongated wing of airfoil cross section with leading and trailing edges;

an elongated control spar positioned below the wing in spaced parallel relation thereto; said spar having a series of cross arms secured thereto at spaced intervals along its longitudinal axis;

a first series of load and control lines connected to the ends of the cross arms at one edge of the spar and to the wing at points space from the leading edge;

a second series of load and control lines connected to the ends of the cross arms at the opposite edge of the control spar and to the wing at points spaced from the trailing edge;

means for suspending a pilot from the control spar; and means secured to the control spar and extending therefrom for rotating the spar about its longitudinal axis to control the angle of attack of the wing.

2. A glider type aerial device as defined in claim 1 wherein:

the wing is divided along its length to form a plurality of independently movable sections;

the control spar is made up of two longitudinal sections, each of which is associated with one or more of the wing sections;

and means for rotating each spar section independently of the other.

3. A glider type aerial device as defined in claim 1 in which:

the first series of load and control lines each include a rigid section attached to the cross arms of the control spar.

* * * * *